US012673687B2

(12) United States Patent
Nordbruch

(10) Patent No.: US 12,673,687 B2
(45) Date of Patent: Jul. 7, 2026

(54) METHOD FOR TESTING A MOTOR VEHICLE

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 17/629,624

(22) PCT Filed: Jun. 9, 2020

(86) PCT No.: PCT/EP2020/065965
§ 371 (c)(1),
(2) Date: Jan. 24, 2022

(87) PCT Pub. No.: WO2021/018453
PCT Pub. Date: Feb. 4, 2021

(65) Prior Publication Data
US 2022/0258749 A1 Aug. 18, 2022

(30) Foreign Application Priority Data
Jul. 26, 2019 (DE) ..................... 10 2019 211 118.1

(51) Int. Cl.
*B60W 50/02* (2012.01)
*B60W 50/04* (2006.01)

(52) U.S. Cl.
CPC ............ *B60W 50/02* (2013.01); *B60W 50/04* (2013.01); *B60W 2050/041* (2013.01)

(58) Field of Classification Search
CPC ................. B60W 50/02; B60W 50/04; B60W 2050/041; B62D 65/04; B62D 63/025
See application file for complete search history.

(56) References Cited

U.S. PATENT DOCUMENTS 5,873,165 A * 2/1999 Bode ...................... B62D 65/02
198/465.1
6,857,889 B1 * 2/2005 Vitale .................... B62D 24/00
439/269.1
(Continued)

OTHER PUBLICATIONS

Translation of International Search Report for Application No. PCT/EP2020/065965 dated Oct. 6, 2020 (2 pages).

*Primary Examiner* — Abby J Flynn
*Assistant Examiner* — Clint Pham
(74) *Attorney, Agent, or Firm* — Michael Best & Friedrich LLP

(57) ABSTRACT

The invention relates to a method for testing a motor vehicle, said motor vehicle comprising an assembly having a rolling chassis and a body provided on the rolling chassis, the rolling chassis comprising multiple first interfaces and the body comprising multiple second interfaces allocated to the first interfaces, so that each pair of first and second interfaces can form a respective connection between the rolling chassis and the body, when the body is assembled on the rolling chassis. The method comprises, for example, a check as to whether all connections are correctly attached. The method comprises, for example, a check as to whether all components of the motor vehicle are responsive. The method also comprises, for example, a check as to whether the body may be used with the rolling chassis. The invention further relates to a device, a computer program, a machine-readable storage medium, a rolling chassis, a body and a motor vehicle.

13 Claims, 2 Drawing Sheets

(56) References Cited

U.S. PATENT DOCUMENTS

| | | | |
|---|---|---|---|
| 8,807,631 | B2 | 8/2014 | Grevener et al. |
| 10,150,525 | B2 | 12/2018 | Berg |
| 2003/0040827 | A1 | 2/2003 | Chernoff et al. |
| 2003/0040828 | A1* | 2/2003 | Chernoff ................ B60T 13/74 |
| | | | 700/97 |
| 2003/0094320 | A1* | 5/2003 | Chernoff ................ B60K 15/07 |
| | | | 180/54.1 |
| 2003/0158635 | A1 | 8/2003 | Pillar et al. |
| 2003/0164255 | A1* | 9/2003 | Borroni-Bird ......... B62D 21/00 |
| | | | 180/54.1 |
| 2012/0277949 | A1* | 11/2012 | Ghimire ................ G07C 5/008 |
| | | | 701/31.7 |
| 2015/0239505 | A1* | 8/2015 | Li ............................ F16B 5/02 |
| | | | 296/35.1 |
| 2016/0070527 | A1* | 3/2016 | Ricci ................... G06Q 10/109 |
| | | | 715/716 |
| 2019/0049966 | A1* | 2/2019 | Poornachandran ..... H04W 4/46 |
| 2022/0009471 | A1* | 1/2022 | Sjodin ................. B60W 30/18 |

* cited by examiner

METHOD FOR TESTING A MOTOR VEHICLE

BACKGROUND OF THE INVENTION

The invention relates to a method for testing a motor vehicle, wherein the motor vehicle comprises an arrangement having a rolling chassis and a vehicle body which is arranged on the rolling chassis, wherein the rolling chassis comprises multiple first interfaces and the vehicle body comprises multiple second interfaces assigned to the first interfaces. The invention furthermore relates to a device, a computer program, a machine-readable memory medium, a rolling chassis, a vehicle body and a motor vehicle.

A rolling chassis generally refers to a chassis or a running gear comprising a drive motor and a drivetrain, such that a rolling chassis can travel under its own drive power.

A vehicle body is commonly arranged on such a rolling chassis.

An advantage in the use of a rolling chassis lies in particular in the fact that several possible vehicle bodies can be provided for one rolling chassis, such that different motor vehicles can be produced efficiently.

After a vehicle body has been arranged on a rolling chassis, it must be ensured that the motor vehicle having the arrangement composed of rolling chassis and vehicle body must function correctly.

SUMMARY OF THE INVENTION

The object on which the invention is based can be seen in providing a concept for efficiently testing a motor vehicle, wherein the motor vehicle comprises an arrangement having a rolling chassis and a vehicle body which is arranged on the rolling chassis, wherein the rolling chassis comprises multiple first interfaces and the vehicle body comprises multiple second interfaces assigned to the first interfaces.

Said object is achieved by means of the respective subject matter of the independent claims. Respectively dependent subclaims relate to advantageous refinements of the invention.

According to a first aspect, a method is provided for testing a motor vehicle, wherein the motor vehicle comprises an arrangement having a rolling chassis and a vehicle body which is arranged on the rolling chassis, wherein the rolling chassis comprises multiple first interfaces and the vehicle body comprises multiple second interfaces assigned to the first interfaces, such that, when the vehicle body is in the state in which it is arranged on the rolling chassis, a respective connection between the rolling chassis and the vehicle body can be formed by means of a respective first and second interface, comprising the following steps:

generating first check demand signals which represent a demand for a first check as to whether the respective first and second interfaces have been correctly attached to one another such that corresponding connections have been formed between the rolling chassis and the vehicle body,
  outputting the generated first check demand signals,
  receiving first check result signals which represent a first check result of the first check,
  determining, on the basis of the first check result, which connections have been formed,
  generating second check demand signals which represent a demand for a second check as to whether components of the rolling chassis and/or of the vehicle body can be correctly addressed via the determined connections that have been formed,
  outputting the generated second check demand signals,
  receiving second check result signals which represent a second check result of the second check, and
  determining, on the basis of the second check result, which components can be correctly or incorrectly addressed via the determined connections that have been formed.

According to a second aspect, a device is provided which is configured to execute all of the steps of the method according to the first aspect.

According to a third aspect, a computer program is provided which comprises commands which, when the computer program is executed by a computer, for example by the device according to the second aspect, cause said computer or said device to execute a method according to the first aspect.

According to a fourth aspect, a machine-readable memory medium is provided in which the computer program according to the third aspect is stored.

According to a fifth aspect, a rolling chassis is provided which comprises the device according to the second aspect.

According to a sixth aspect, a vehicle body is provided which comprises the device according to the second aspect.

According to a seventh aspect, a motor vehicle is provided which comprises a rolling chassis and a vehicle body arranged on the rolling chassis and the device according to the second aspect.

The invention is based on and includes the knowledge that the above object can be achieved by virtue of it being checked whether all connections between the rolling chassis and the vehicle body have been correctly attached and/or formed. Furthermore, the invention encompasses the concept of checking whether all components and/or functionalities can be addressed via the connections formed. Here, "can be addressed" means in particular that the components and/or functionalities can be communicated and/or corresponded with via the connections formed.

In order to check whether all connections have been correctly attached, it is thus the case in particular that the first check demand signals are generated and output in order to execute a corresponding first check. The first check result in this case then indicates a result of said first check. On the basis of this first check result, it is determined which connections between the respective first and respective second interfaces have been formed. In order to check whether all components and/or functionalities can be addressed, a corresponding second check is provided. For this purpose, the second check demand signals are generated and output in order to check the correct addressability.

A result of this second check is the second check result, which indicates which components can be correctly or incorrectly addressed via the connections formed.

The testing of the motor vehicle thus in this case comprises a check as to whether all connections have been correctly attached and a check as to whether all components and/or functionalities can be addressed.

Thus, in particular, the technical advantage is achieved that a concept for efficiently testing a motor vehicle is provided.

According to one embodiment, the method according to the first aspect is a computer-implemented method.

Thus, for example, the technical advantage is achieved that the method can be carried out efficiently using a computer.

A chassis refers to a motor vehicle chassis. This thus means that the rolling chassis is a rolling chassis of a motor vehicle.

A vehicle body refers to a motor vehicle body.

For the German expression "Karosserie" ["vehicle body"], the terms "body" or "top hat" may also be used in English. It follows from this that the expression "Karosserie" ["vehicle body"] in German may also be substituted by the expression "Aufbau" ["superstructure"].

According to one embodiment, the expression "vehicle body" and/or "motor vehicle body" may be interpreted broadly. For example, according to one embodiment, the vehicle body may comprise one or more of the following components: motor vehicle seat, dashboard, gearshift lever, motor vehicle window, motor vehicle door, motor vehicle interior trim, airbag, assistance system, video camera, human-machine interface.

The expression "vehicle body" can thus refer in the context of this description to the upper part ("top hat") of a motor vehicle, which is arranged on a chassis. The vehicle body may thus, analogously to a prefabricated part of a prefabricated house, be a component that has already been manufactured to such a degree that a finished motor vehicle, that is to say in particular a motor vehicle that is ready to drive, is formed after the vehicle body has been arranged on the rolling chassis.

According to one embodiment, a rolling chassis comprises one or more of the following components: wheel, axle, drive motor, steering system, brake, frame, thermal components, battery, battery housing, sensor, in particular surroundings sensor (for example: radar sensor, lidar sensor, ultrasound sensor, magnetic field sensor, infrared sensor, video sensor), control unit (referred to as "ECU", "electronic control unit"), PC (personal computer).

The rolling chassis, according to one embodiment, may thus, analogously to a prefabricated part of a prefabricated house, be a component that has already been manufactured to such a degree that a finished motor vehicle, that is to say in particular a motor vehicle that is ready to drive, is formed after the vehicle body has been arranged on the rolling chassis.

The rolling chassis thus refers in particular to the lower component in relation to the upper component (vehicle body). Thus, according to one embodiment, a finished motor vehicle, that is to say in particular a motor vehicle that is ready to drive, is formed as a result of the arrangement of the upper component (vehicle body) and lower component (rolling chassis), wherein the upper component is arranged on the lower component.

According to one embodiment, it is provided that vehicle body identification signals are received which represent a vehicle body identification of the vehicle body, wherein, on the basis of the vehicle body identification, in a third check and/or in the first check, it is checked whether the vehicle body is admissible for the rolling chassis.

Thus, for example, the technical advantage is achieved that it can be efficiently checked whether the vehicle body is admissible for the rolling chassis. That the vehicle body is admissible for the rolling chassis means in particular that the vehicle body may be used with the rolling chassis as a corresponding arrangement in a motor vehicle.

The body identification may for example be used in order, from a database in which a respective vehicle body specification is stored for multiple different vehicle bodies, to read out the vehicle body specification associated with the vehicle body.

The third and/or first check are then executed for example on the basis of the vehicle body specification.

Thus, in one embodiment, in addition to the check as to whether the respective first and second interfaces have been correctly attached to one another, the first check comprises a further check as to whether the vehicle body may be used for the rolling chassis.

According to one embodiment, it is provided that self-test demand signals are generated and output, which self-test demand signals represent a demand for an execution of a respective self-test by components and/or functionalities of the rolling chassis and/or of the vehicle body.

Thus, for example, the technical advantage is achieved that the motor vehicle can be tested efficiently. In particular, the technical advantage is thus achieved that the components and/or functionalities can be tested efficiently.

According to one embodiment, it is provided that third check results are generated and output, which third check results represent a third check result of the third check.

According to one embodiment, it is provided that self-test result signals are received which represent a result of the respective self-test.

According to one embodiment, it is provided that cooperation test demand signals are generated and output, which cooperation test demand signals represent a demand for a cooperation test of components and/or functionalities of the rolling chassis and/or of the vehicle body.

Thus, for example, the technical advantage is achieved that the motor vehicle can be tested efficiently. In particular, the technical advantage is thus achieved that a cooperation of components and/or functionalities of the rolling chassis and/or of the vehicle body can be tested efficiently.

A cooperation of components and/or functionalities may for example be as follows: an emergency braking assistant uses video data from a video camera in order to make decisions regarding an emergency braking operation. If a decision is made to execute an emergency braking operation, the emergency braking assistant and/or an emergency braking assistance function, which is implemented for example in a video camera control unit of the video camera or in some other control unit of the vehicle body, transmits corresponding emergency braking control signals to a brake and/or to a brake control unit of the brake. Here, the brake and brake control unit are comprised by the rolling chassis.

This means that a cooperation of the emergency braking assistant (functionality) and/or of the video camera control unit or of the other control unit (components), which are comprised by the vehicle body, with a brake control unit and/or a brake (components), which are comprised by the rolling chassis, is thus correspondingly tested.

In the case of the cooperation described by way of example immediately above, it may be provided in particular that, instead of or in addition to the brake, the cooperation of the emergency brake assistance with a drive and/or a steering system is tested, wherein both the drive and the steering system are comprised by the rolling chassis.

Correspondingly, it is then for example the case that the emergency braking assistance transmits drive control signals to the drive and/or to a drive control unit and/or to the steering system and/or to a steering system control unit, wherein the drive control unit and steering system control unit are comprised by the rolling chassis.

According to one embodiment, it is provided that, if one of the results indicates that a fault is present, disablement signals are generated on the basis of said one result, which disablement signals indicate which component(s) and/or functionality (functionalities) of the motor vehicle and/or of the rolling chassis and/or of the vehicle body should be disabled, wherein the generated disablement signals are output.

Thus, for example, the technical advantage is achieved that adverse effects owing to the fault can be prevented, or at least partially prevented, efficiently.

For example, it is provided that the use of a drive motor of the motor vehicle should be disabled. Thus, for example, the technical advantage is achieved that it is possible to efficiently prevent the motor vehicle from being operated at all.

According to one embodiment, it is provided that, if one of the results indicates that a fault is present, restriction signals are generated on the basis of said one result, which restriction signals indicate which component(s) and/or functionality (functionalities) of the motor vehicle and/or of the rolling chassis and/or of the vehicle body should be used further only with restriction, wherein the generated restriction signals are output.

Thus, for example, the technical advantage is achieved that adverse effects owing to the fault can be prevented, in particular at least partially prevented.

According to one embodiment, it is provided that, if one of the results indicates that a fault is present, solution signals are generated on the basis of said one result, which solution signals represent a proposed solution for solving a problem that a fault is present, wherein the solution signals are output.

Thus, for example, the technical advantage is achieved that the problem can be solved efficiently.

According to one embodiment, it is provided that, if one of the results indicates that a fault is present, a communication message is transmitted via a communication network to at least one network address, wherein the communication message comprises an item of information stating that a fault is present.

Thus, for example, the technical advantage is achieved that information regarding the fault can be conveyed efficiently.

A network address is for example assigned to a computer of a user of the rolling chassis and/or of the motor vehicle.

A network address is for example assigned to a mobile device of the user. The mobile device is for example a mobile telephone.

A network address is for example assigned to a server of a manufacturer of the rolling chassis.

A network address is for example assigned to a workshop and/or a server of a workshop.

A network address is for example assigned to a remote or motor vehicle-external testing entity. In Germany, for example, such a testing entity is the TÜV (Technische Überwachungsverein [Technical Inspection Association]).

For example, it is provided that the communication message is transmitted to multiple network addresses via the communication network.

A communication network comprises, for example, a wireless communication network. A wireless communication network comprises, for example, a WLAN communication network and/or a mobile radio network.

According to one embodiment, it is provided that, if one of the results indicates that a fault is present, control signals for controlling a human-machine interface of the motor vehicle are generated such that, when the human-machine interface is controlled on the basis of the control signals, said human-machine interface signals that a fault is present, wherein the generated control signals are output.

Thus, for example, the technical advantage is achieved that it is possible in an efficient manner to signal that a fault is present.

A human-machine interface comprises, for example, one or more signal transducers. A signal transducer is for example an optical, an acoustic or a haptic signal transducer.

According to one embodiment, the method according to the first aspect comprises control of the human-machine interface of the motor vehicle on the basis of the output control signals.

According to one embodiment, it is provided that one or more method steps are documented, in particular are documented in a blockchain.

Thus, for example, the technical advantage is achieved that the execution of the method can also be analyzed retrospectively, that is to say after the method has been executed. In particular, documentation in a blockchain has the technical effect that falsification-proof and manipulation-proof documentation is possible.

According to one embodiment, it is provided that operating state signals are received which represent an operating state of the motor vehicle, wherein the generation of check demand signals is performed in a manner dependent on the operating state of the motor vehicle.

Thus, for example, the technical advantage is achieved that the check can be executed independently of the operating state. Thus, in particular, the technical advantage is achieved that the check can be executed efficiently.

An operating state may for example be one of the following operating states: starting phase, stopping phase, traveling phase, holding phase and off phase.

For example, it is provided that the one or more steps of the check are executed during a traveling phase.

This thus means in particular that the one or more steps of the generation of the corresponding check demand signals can be executed in a manner dependent on the operating state.

This thus means, for example, that the one or more steps of the generation and outputting of the corresponding check demand signals are executed automatically in the starting phase of the motor vehicle and/or are automatically executed during a traveling phase.

It is pointed out that, in the above wording "if one of the results indicates that a fault is present", the term "result" is used as a generic all-encompassing term, and/or as a placeholder, for the first check result, the second check result, the third check result, the respective self-test result and/or the cooperation test result.

According to one embodiment, it is provided that the method according to the first aspect is carried out or executed by means of the device according to the second aspect.

Method features emerge analogously from corresponding device features and vice versa. This thus means in particular that technical functionalities of the method according to the first aspect emerge from corresponding technical functionalities of the device according to the second aspect, and vice versa.

A connection is for example one of the following connections: mechanical, electrical, thermal and fluidic connection. A connection is for example a communication connection. A communication connection may for example also be referred to as an information connection. A connection is for example a digital or an analog connection.

A component is for example a brake, a steering system or a camera.

An interface, that is to say in particular a first and/or a second interface, is for example one of the following interfaces: mechanical, electrical, thermal, liquid and hydraulic interface. The interfaces are in particular different or in particular identical. An interface is for example a communication interface, which may also be referred to as an information interface. An interface is for example a digital or an analog communication interface.

BRIEF DESCRIPTION OF THE DRAWINGS

Exemplary embodiments of the invention are illustrated in the drawings and will be discussed in more detail in the following description.

In the drawings.

DETAILED DESCRIPTION

Figure 1:
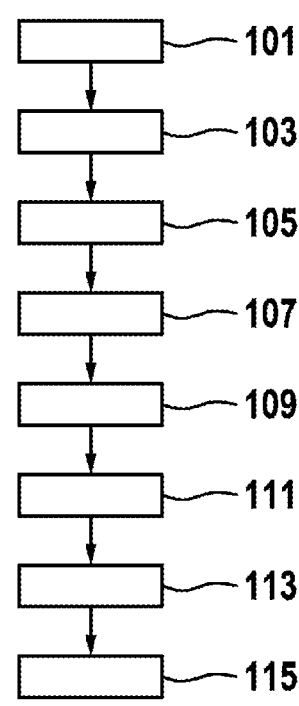
FIG. 1 shows a flow diagram of a method for checking whether a rolling chassis, which is comprised by a motor vehicle and on which a vehicle body is arranged, is being used admissibly.

FIG. 1 shows a flow diagram of a method for testing a motor vehicle, wherein the motor vehicle comprises an arrangement having a rolling chassis and a vehicle body which is arranged on the rolling chassis, wherein the rolling chassis comprises multiple first interfaces and the vehicle body comprises multiple second interfaces assigned to the first interfaces, such that, when the vehicle body is in the state in which it is arranged on the rolling chassis, a respective connection between the rolling chassis and the vehicle body can be formed by means of a respective first and second interface, comprising the following steps:

generating 101 first check demand signals which represent a demand for a first check as to whether the respective first and second interfaces have been correctly attached to one another such that corresponding connections have been formed between the rolling chassis and the vehicle body, outputting 103 the generated first check demand signals, receiving 105 first check result signals which represent a first check result of the first check, determining 107, on the basis of the first check result, which connections have been formed, generating 109 second check demand signals which represent a demand for a second check as to whether components of the rolling chassis and/or of the vehicle body can be correctly addressed via the determined connections that have been formed, outputting 111 the generated second check demand signals, receiving 113 second check result signals which represent a second check result of the second check, and determining 115, on the basis of the second check result, which components can be correctly or incorrectly addressed via the determined connections that have been formed.

Figure 2:
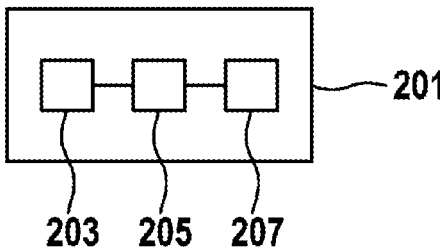
FIG. 2 shows a device.

FIG. 2 shows a device 201.

The device 201 is configured to execute all of the steps of the method according to the first aspect.

The device 201 comprises an input 203 which is configured to receive the first check result signals and to receive the second check result signals.

The device 201 furthermore comprises a processor 205 which is configured to generate the first check demand signals and, on the basis of the first check result, to determine which connections have been formed. The processor 205 is furthermore configured to generate the second check demand signals. The processor 205 is furthermore configured to, on the basis of the second check result, determine which components can be correctly or incorrectly addressed via the connections formed.

The device 201 comprises an output 207 which is configured to output the generated check demand signals and the generated second check demand signals.

In an embodiment which is not shown, the device 201 comprises multiple processors instead of the processor 205.

According to one embodiment, signals are received by means of the input 203. This thus means in particular that the input 203 is configured to receive the corresponding signals.

According to one embodiment, it is provided that signals that are output are output by means of the output 207. The output 207 is thus in particular configured to output the corresponding signals.

According to one embodiment, the processor 205 is configured to generate the self-test demand signals and/or the cooperation test demand signals and/or the disablement signals and/or the restriction signals and/or the solution signals and/or the communication message and/or the control signals for the control of a human-machine interface.

Furthermore, according to one embodiment, the processor 205 is configured to document one or more method steps, in particular to document these in a blockchain.

Figure 3:
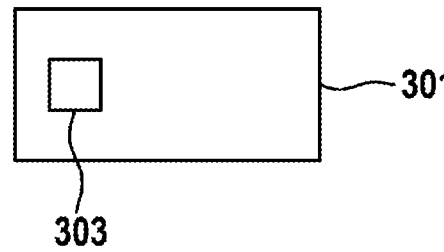
FIG. 3 shows a machine-readable memory medium.

FIG. 3 shows a machine-readable memory medium 301.

A computer program 303 is stored on the machine-readable memory medium 301. The computer program 303 comprises commands which, when the computer program 303 is executed by a computer, cause said computer to execute a method according to the first aspect.

Figure 4:
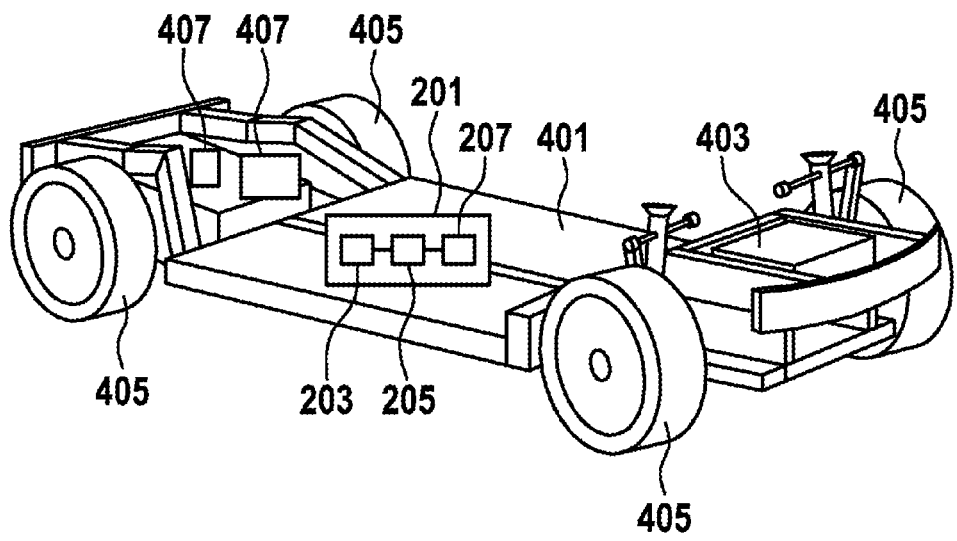
FIG. 4 shows a first rolling chassis.

FIG. 4 shows a first rolling chassis 401.

The rolling chassis 401 comprises a drive motor 403 and four wheels 405.

The rolling chassis 401 furthermore comprises multiple components 407. The components 407 may for example be one or more of the components referred to above that have been described in conjunction with the rolling chassis.

The rolling chassis 401 furthermore comprises the device 201 as per FIG. 2.

Figure 5:
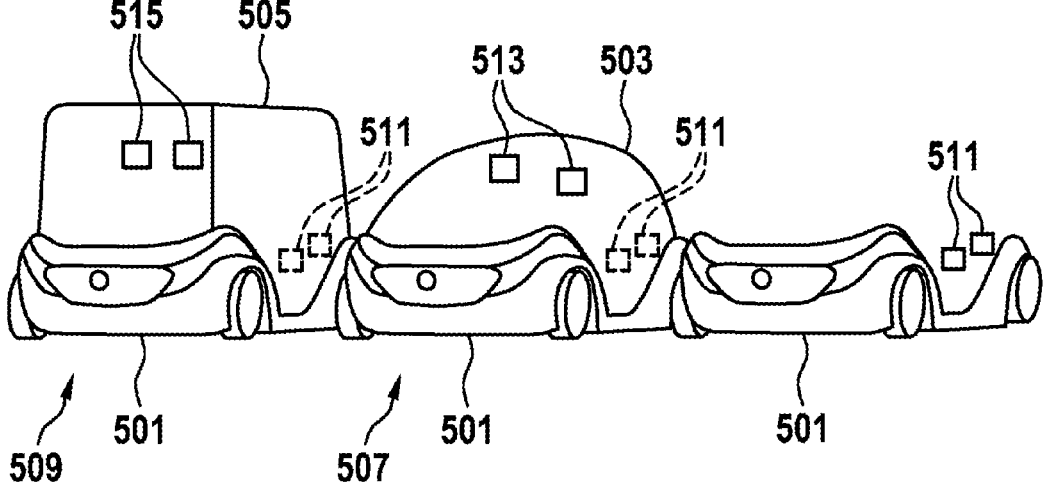
FIG. 5 shows a second rolling chassis and two different vehicle bodies.

FIG. 5 shows three examples of the same second rolling chassis 501 comprising multiple components 511. The components 511 may for example be one or more of the components referred to above that have been described in conjunction with the rolling chassis.

A second rolling chassis 501 without a vehicle body is shown at the far right in FIG. 5.

At the far left and in the center, there is shown in each case one second rolling chassis 501 with a different vehicle body 503, 505 (first vehicle body 503 and second vehicle body 505), wherein the corresponding vehicle bodies 503, 505 are arranged on the corresponding rolling chassis 501.

The first vehicle body 503 comprises multiple components 513.

The second vehicle body 505 comprises multiple components 515.

The components 513 and 515 may for example be one or more of the components referred to above that have been described in conjunction with the vehicle body.

Thus, FIG. 5 shows two motor vehicles: a first motor vehicle 507 comprising the arrangement of the second rolling chassis 501 and the first vehicle body 503, and a second motor vehicle 509 comprising an arrangement composed of the second rolling chassis 501 and the second vehicle body 505.

According to one embodiment, it may be provided that the rolling chassis 501 comprises the device 201 as per FIG. 2.

According to one embodiment, it may be provided that, in addition to or instead of the rolling chassis 501, the two vehicle bodies 503, 505 also comprise the device 201 as per FIG. 2.

According to one embodiment, it is provided that the method according to the first aspect is automatically executed after the vehicle bodies 503, 505 have been arranged on the corresponding rolling chassis 501.

In summary, the concept described here is based on the fact that, after a vehicle body has been arranged on a rolling chassis, the following actions in particular are automatically performed:

Checking whether all connections (mechanical, electrical, thermal/fluidic, . . . ) have been correctly attached.

Checking whether all components (for example brakes, steering system, camera) can be addressed, that is to say whether it is possible to correspond with the components via the connections.

Checking whether the vehicle body may be used.

An interface, that is to say in particular a first and/or a second interface, is for example a mechanical, electrical, thermal, fluidic, hydraulic interface. The interfaces are in particular different or in particular identical. An interface is for example a communication interface, which can also be referred to as an information interface. An interface is for example a digital or an analog communication interface.

A component is for example one of the following components: brake, steering system, camera, tachometer.

In one embodiment, it is provided that a self-test of selected and/or all components is executed. Preferably of those components which are affected by the arrangement of the vehicle body onto the rolling chassis.

In one embodiment, an interaction of selected and/or of all components is tested.

In one embodiment, functionalities (for example application of accelerator, application of brakes, camera identifies objects . . . ) of selected and/or of all components are tested and/or checked.

If one or more faults are present, the functionality of the motor vehicle is preferably disabled. This thus means in particular that the motor vehicle cannot be started and used.

This applies in particular to safety-critical faults (for example brakes or steering system are non-functional and/or only partially functional).

Should relatively minor or non-safety-critical faults arise, then it is provided according to one embodiment that use of the motor vehicle is allowed. In particular, it may be provided that a corresponding notification is output to the user. The use may for example be allowed only with functional restrictions.

In one embodiment, it is provided that faults are communicated to a user, who has for example assembled the motor vehicle.

In one embodiment, it is provided that, if a fault is present, advice for solving the problem that a fault has occurred is communicated.

The communication, that is to say in particular communication regarding faults, regarding proposed solutions and advice, may be output in the motor vehicle by means of a human-machine interface, and/or by way of additional signal sources, for example LEDs, to connections that display for example red or green (red in the event of a fault, green in the absence of a fault).

The corresponding communications may also be transmitted for example to an external device. Such an external device is for example a terminal, in particular a mobile terminal, for example a smartphone. The external device may then for example display the advice. \

A human-machine interface comprises, for example, a screen.

In one embodiment, it is provided that checks are performed shortly after a start of the motor vehicle. This has the advantage in particular that components and/or functionalities that can be tested and/or checked only during travel can then be tested and checked in an efficient manner.

According to one embodiment, the method, in particular including faults, is updated over a period of time. This may for example be performed off-line in a workshop or (for example automatically), online (for example from a cloud infrastructure) by the rolling chassis manufacturer and/or by the end customer themself.

In one embodiment, it is provided that the results are documented, because safety-critical infringements may also have occurred here. For example, it is provided that falsification-proof methods, such as a blockchain, are used for the documentation.

In one embodiment, it is provided that the results are additionally transmitted to a motor vehicle-external testing entity, which can perform an analysis of the check. In Germany, for example, such an external testing entity is the Technische Uberwachungsverein [Technical Inspection Association] (TUV), or such an external testing entity may be a manufacturer of the rolling chassis and/or of the vehicle body and/or of the motor vehicle. For example, the testing entity must first activate the use of the arrangement of rolling chassis and vehicle body arranged thereon. Before this, therefore, no travel or use of the motor vehicle is possible. This thus means in particular that, according to one embodiment, the testing entity must activate the motor vehicle. It will do so in particular only if the analysis of the check has shown that no fault is present.

The invention claimed is:

1. A method for testing a motor vehicle (507, 509), wherein the motor vehicle (507, 509) comprises an arrangement having a rolling chassis (401, 501) and a vehicle body (503, 505) which is arranged on the rolling chassis (401, 501), wherein the rolling chassis (401, 501) comprises multiple first interfaces and the vehicle body (503, 505) comprises multiple second interfaces assigned to the first interfaces, such that, when the vehicle body (503, 505) is in the state in which it is arranged on the rolling chassis (401, 501), a respective connection between the rolling chassis (401, 501) and the vehicle body (503, 505) can be formed by means of a respective first and second interface, comprising the following steps:

automatically generating (101), in response to the rolling chassis (401, 501) being arranged on the vehicle body (503, 505), first check demand signals which represent a demand for a first check as to whether the respective first and second interfaces of the multiple first interfaces and the multiple second interfaces have been correctly attached to one another such that corresponding connections have been formed between the rolling chassis (401, 501) and the vehicle body (503, 505), the multiple first interfaces and the multiple second interfaces including at least two different interface types selected from a group consisting of a mechanical interface, an electrical interface, a thermal/fluidic interface, and a hydraulic interface, outputting (103) the generated first check demand signals, receiving (105) first check result signals which represent a first check result of the first check, determining (107), on the basis of the first check result, which connections between which respective first and second interfaces of the multiple first interfaces and the multiple second interfaces have been formed, generating (109), in response to determining which connections have been formed, second check demand signals configured to verify whether components of the rolling chassis (401, 501) and/or of the vehicle body (503, 505) can be correctly addressed via the respective determined connections that have been formed, outputting (111) the generated second check demand signals, receiving (113) second check result signals which represent a second check result of the second check, determining (115), on the basis of the second check result, which components can be correctly or incorrectly addressed via the determined connections that have been formed, and performing, in response to determining that one of the results indicates that a fault is present, at least one selected from the group consisting of restricting a function of the motor vehicle (507, 509), disabling a function of the motor vehicle (507, 509), and generating an alert at a human-machine interface.

2. The method as claimed in claim 1, wherein vehicle body identification signals are received which represent a vehicle body identification of the vehicle body (503, 505), wherein, on the basis of the vehicle body identification, in a third check and/or in the first check, it is checked whether the vehicle body (503, 505) is admissible for the rolling chassis (401, 501).

3. The method as claimed in claim 1, wherein self-test demand signals are generated and output, which self-test demand signals represent a demand for an execution of a respective self-test by components and/or functionalities of the rolling chassis (401, 501) and/or of the vehicle body (503, 505).

4. The method as claimed in claim 1, wherein cooperation test demand signals are generated and output, which cooperation test demand signals represent a demand for a cooperation test of components and/or functionalities of the rolling chassis (401, 501) and/or of the vehicle body (503, 505).

5. The method as claimed in claim 1, wherein, if one of the results indicates that a fault is present, disablement signals are generated on the basis of said one result, which disablement signals indicate which component(s) and/or functionality (functionalities) of the motor vehicle (507, 509) and/or of the rolling chassis (401, 501) and/or of the vehicle body (503, 505) should be disabled, wherein the generated disablement signals are output.

6. The method as claimed in claim 1, wherein, if one of the results indicates that a fault is present, restriction signals are generated on the basis of said one result, which restriction signals indicate which component(s) and/or functionality (functionalities) of the motor vehicle (507, 509) should be used further only with restriction, wherein the generated restriction signals are output.

7. The method as claimed in claim 1, wherein, if one of the results indicates that a fault is present, solution signals are generated on the basis of said one result, which solution signals represent a proposed solution for solving a problem that a fault is present, wherein the solution signals are output.

8. The method as claimed in claim 1, wherein, if one of the results indicates that a fault is present, a communication message is transmitted via a communication network to at least one network address, wherein the communication message comprises an item of information stating that a fault is present.

9. The method as claimed in claim 1, wherein, if one of the results indicates that a fault is present, control signals for controlling a human-machine interface of the motor vehicle (507, 509) are generated such that, when the human-machine interface is controlled on the basis of the control signals, said human-machine interface outputs an optical alert, an acoustic alert, or a haptic alert that a fault is present, wherein the generated control signals are output.

10. The method as claimed in claim 1, wherein one or more method steps are documented in a blockchain.

11. The method as claimed in claim 1, wherein operating state signals are received which represent an operating state of the motor vehicle (507, 509), wherein the generation of check demand signals is performed in a manner dependent on the operating state of the motor vehicle (507, 509).

12. A device (201) which is configured to execute all of the steps of the method as claimed in claim 1.

13. A non-transitory, computer-readable medium (301) containing instructions that when executed by a computer cause the computer to test a motor vehicle (507, 509) that has a rolling chassis (401, 501) and a vehicle body (503, 505) which is arranged on the rolling chassis (401, 501), wherein the rolling chassis (401, 501) comprises multiple first interfaces and the vehicle body (503, 505) comprises multiple second interfaces assigned to the first interfaces, such that, when the vehicle body (503, 505) is in the state in which it is arranged on the rolling chassis (401, 501), a respective connection between the rolling chassis (401, 501) and the vehicle body (503, 505) can be formed by means of a respective first and second interface, by:

automatically generating (101), in response to the rolling chassis (401, 501) being arranged on the vehicle body (502, 505), first check demand signals which represent a demand for a first check as to whether the respective first and second interfaces of the multiple first interfaces and the multiple second interfaces have been correctly attached to one another such that corresponding connections have been formed between the rolling chassis (401, 501) and the vehicle body (503, 505), the multiple first interfaces and the multiple second interfaces including at least two different interface types selected from a group consisting of a mechanical interface, an electrical interface, a thermal/fluidic interface, and a hydraulic interface, outputting (103) the generated first check demand signals, receiving (105) first check result signals which represent a first check result of the first check, determining (107), on the basis of the first check result, which connections between which respective first and second interfaces of the multiple first interfaces and the multiple second interfaces have been formed, generating (109), in response to determining which connections have been formed, second check demand signals configured to verify whether components of the rolling chassis (401, 501) and/or of the vehicle body (503, 505) can be correctly addressed via the respective determined connections that have been formed, outputting (111) the generated second check demand signals, receiving (113) second check result signals which represent a second check result of the second check, determining (115) in response to determining which connections have been formed, on the basis of the second check result, which components can be correctly or incorrectly addressed via the determined connections that have been formed, and performing, in response to determining that one of the results indicates that a fault is present, at least one selected from the group consisting of restricting a function of the motor vehicle (507, 509), disabling a function of the motor vehicle (507, 509), and generating an alert at a human-machine interface.

\* \* \* \* \*